(12) United States Patent
Wi et al.

(10) Patent No.: US 12,535,513 B2
(45) Date of Patent: Jan. 27, 2026

(54) STANDARD RECTANGULAR WAVEGUIDE WITH RF PORT INPUT TRANSITION

(71) Applicant: KOREA INSTITUTE OF FUSION ENERGY, Daejeon (KR)

(72) Inventors: Hyun Ho Wi, Daejeon (KR); Son Jong Wang, Daejeon (KR)

(73) Assignee: Korea Institute of Fusion Energy, Daejeon (KR)

( * ) Notice: Subject to any disclaimer, the term of this patent is extended or adjusted under 35 U.S.C. 154(b) by 180 days.

(21) Appl. No.: 18/472,858

(22) Filed: Sep. 22, 2023

(65) Prior Publication Data

US 2024/0319244 A1   Sep. 26, 2024

(30) Foreign Application Priority Data

Mar. 24, 2023   (KR) ........................ 10-2023-0038915

(51) Int. Cl.
*G01R 27/32* (2006.01)
*H01P 5/16* (2006.01)

(52) U.S. Cl.
CPC ................ *G01R 27/32* (2013.01); *H01P 5/16* (2013.01)

(58) Field of Classification Search
CPC ........ G01R 1/24; G01R 27/32; G01R 33/583; G01R 27/02; G01R 27/28; G01R 33/3678; G01R 21/06; G01R 27/2664; G01R 31/2837; H01P 1/365; H01P 3/12; H01P 5/16; H01P 5/185; H01P 3/003; H01P 1/127; H01P 1/15; H01P 5/024
See application file for complete search history.

(56) References Cited

U.S. PATENT DOCUMENTS

| | | | | |
|---|---|---|---|---|
| 4,124,823 A | | 11/1978 | Sechi | |
| 4,672,328 A | * | 6/1987 | Adachi | ................... H03F 3/601 330/297 |
| 4,673,946 A | * | 6/1987 | Hoover | ................... H01P 5/082 343/776 |
| 4,691,177 A | * | 9/1987 | Wong | ...................... H01P 1/122 333/108 |
| 5,264,860 A | * | 11/1993 | Quan | ................... H01Q 13/085 343/768 |
| 6,121,833 A | * | 9/2000 | Rattay | ..................... H01L 23/66 330/53 |

FOREIGN PATENT DOCUMENTS

KR    10-2017-0050009 A    5/2017
WO    WO 98/23132    5/1998

* cited by examiner

*Primary Examiner* — Vinh P Nguyen
(74) *Attorney, Agent, or Firm* — Knobbe, Martens, Olson & Bear, LLP (57) ABSTRACT

Disclosed herein is a waveguide with an RF port input transition. The waveguide includes: a tubular rectangular body having openings formed at opposite sides thereof, each of the openings having a flange therearound; multiple isolator ports formed at predetermined intervals in one wall of the rectangular body, the isolator ports each being switchable between open and closed states; multiple impedance matching ports formed at predetermined intervals in another wall of the rectangular body opposite the one wall, the impedance matching ports each being switchable between open and closed states; and a radiator port formed at a center of the one wall of the rectangular body.

8 Claims, 8 Drawing Sheets

STANDARD RECTANGULAR WAVEGUIDE WITH RF PORT INPUT TRANSITION

CROSS REFERENCE TO RELATED APPLICATION

The present application claims priority to Korean Patent Application No. 10-2023-0038915, filed Mar. 24, 2023, the entire content of which is incorporated herein for all purposes by reference in its entirety.

FIELD

Embodiments of the disclosed technology relate to a waveguide with an RF port input transition and, more particularly, to a standard rectangular waveguide with an RF port input transition, which can be used as a normal standard waveguide while being operable to perform RF measurement.

BACKGROUND

In general, a nuclear fusion power plant uses energy generated by nuclear fusion reaction to obtain "burning plasma" that can be maintained at extremely high temperatures and densities, and generates electricity from the thermal energy of the burning plasma. Related research and experiments have progressed to the point of realizing plasma with a temperature of over 100 million degrees Celsius in a short period of time.

Such a nuclear fusion power plant employs a nuclear fusion apparatus called as a "tokamak" that can stably confine plasma in order to obtain plasma with a temperature of over 100 million degrees Celsius. The tokamak includes a doughnut-shaped magnetic barrier that confines plasma with a magnetic field in a vacuum and provides induction heating that heats plasma electrons to temperatures as high as tens of millions of degrees Celsius using the Joule effect of plasma current.

However, as the induction heating ($P=\eta j2$, $\eta$ being a plasma resistance, j being a plasma current density) temperature increases, the resistance of electrons is inversely proportional to 3/2 of the temperature. As a result, the induction heating using the Joule effect becomes inefficient.

Accordingly, the tokamak uses non-inductive heating to raise the temperature of plasma ions to 100 million degrees Celsius or more. There are two types of non-inductive heating: radio frequency (RF) heating, which uses electromagnetic waves, and neutron beam (NB) heating, which uses neutron beams.

Heating apparatuses using electromagnetic waves can be divided into devices that use microwaves having an ultra-high frequency (tens of GHz to hundreds of GHz) and devices that use RF waves having a high frequency, such as about 1/1,000 of the ultra-high frequency.

Examples of the RF heating apparatuses can include an electron cyclotron heating and current drive (ECH/CD) heating apparatus that utilizes electron resonance in microwaves (or millimeter waves) to transfer energy from electromagnetic waves to plasma electrons for heating, a lower hybrid heating and current drive (LHCD) heating apparatus that uses microwaves (2 GHz and 5 GHz) and an ion cyclotron range of frequencies (ICRF) heating apparatus that utilizes ion resonance in the frequency band of 30 MHz to 60 MHz to heat plasma ions.

In such an RF heating apparatus, a waveguide is mainly used as a main RF transmission line. For example, for an LHCD heating apparatus using the microwaves, it is important to have an antenna capable of emitting the microwaves in a direction of incidence which is parallel to a magnetic field in plasma and an electric field which has a component parallel to the magnetic field. This can be accomplished by using a waveguide array including several small rectangular waveguides arranged vertically.

An RF waveguide can be used for RF measurement and can include RF measuring instruments to perform the RF measurement of RF component. The RF measuring instruments can have an input port connected to an N-type or SMA-type port. The RF component (e.g., an RF component to be measured) may require a coaxial line transition for connection to the input port.

In the case of an RF system already built on an existing waveguide, in order to measure RF characteristics of a certain component, it is necessary to disassemble a part of the RF system, install an RF transition for measurement, remove the RF transition after measurement, and reinstall the RF system. However, during the reassembly of the waveguide, the alignment between the waveguide and other waveguides may change, causing the increase in wave reflection and transmission loss in the RF system.

Such a change in alignment between the waveguide and other waveguides during reassembly of the waveguide can affect the performance and accuracy of the RF system and can cause an increase in time and labor and time required for disassembly and installation work. In order to solve these problems, a device such as a mechanical waveguide switch with multiple input/output ports has been commonly used. However, this device can only provide a limited solution to the problems.

Therefore, there is a need for a waveguide that has both a standard mode for use as a normal rectangular waveguide for RF transmission and a measurement mode for instrumental measurement, thereby enabling measurement of characteristics of a certain RF component without disassembling, reassembling, and realigning the entire RF system.

A reference to the existing high-power RF waveguides is disclosed in Korean Patent Application Publication No. 10-2017-0050009, titled "Bidirectional coupler for broadband high-power coaxial waveguide."

The waveguide disclosed in this reference can enable bidirectional measurement of transmitted and reflected RF power through two capacitive couplers mounted on an upper portion of the waveguide with a space between. The waveguide in this reference can also prevent the electrostatic breakdown of the waveguide due to high power output through formation of a coaxial structure. However, this waveguide may not be used for the purpose of both RF measurement and as waveguide.

SUMMARY

To address at least a portion of the above-described deficiencies, one or more aspects of the disclosed technology correspond to a waveguide with an RF port input transition. The waveguide, as disclosed herein, can be used as a normal rectangular waveguide without disassembling and reassembling an RF system and can also provide a measurement mode. More specifically, the waveguide can include an RF port input transition apparatus that can provide the functionality of transition between normal waveguide and a measurement mode to measure the characteristics of a certain RF component. For example, the waveguide can be used as a normal rectangular waveguide without disassembling and reassembling an RF system and can also be used to perform instrumental measurements to determine the characteristics of a certain RF component. In some aspects, an RF heating apparatus can include the waveguide with the RF port input transition.

It will be understood that aspects of the disclosed technology are not limited to the above. The above and other aspects of the disclosed technology will become apparent to those skilled in the art from the detailed description of the following embodiments in conjunction with the accompanying drawings.

In accordance with one or more aspects of the disclosed technology, a waveguide with an RF port input transition includes: a tubular rectangular body having openings formed at opposite sides thereof, each of the openings having a flange therearound; multiple isolator ports formed at predetermined intervals in one wall of the rectangular body, each isolator port being switchable between open and closed states and allowing an RF isolator to be selectively coupled thereto; multiple impedance matching ports formed at predetermined intervals in another wall of the rectangular body opposite the one wall, each impedance matching port being switchable between open and closed states and allowing an RF impedance matcher to be selectively coupled thereto; and a radiator port formed at a center of the one wall of the rectangular body, the radiator port being switchable between open and closed states and allowing an RF radiator to be selectively coupled thereto, whereby the waveguide is operable in a measurement mode for measuring RF characteristics of the rectangular body.

In some embodiments, the waveguide may further include: in the measurement mode, an RF isolator coupled to one of the multiple isolator ports; an RF impedance matcher coupled to one of the multiple impedance matching ports; and an RF radiator coupled to the radiator port, wherein the RF isolator and the RF impedance matcher are disposed opposite each other with respect to the RF radiator.

In some embodiments, the RF radiator may be provided in the form of a bar. The dimension can be correlated with the radiation frequency wave of the radiator, such as radiated frequency, resonated frequency, or RF wave. The dimension can be the height of the bar. For example, the dimension of the bar can be expressed as $$d \text{ (dimension)} = \frac{1}{4}\lambda + \frac{1}{2}\lambda \times n$$

($\lambda$ being a wavelength of the frequency, n being an integer greater than or equal to 0). In some embodiments, the frequency is a high frequency. In addition, the dimension can also be further adjusted based on the width of the bar.

In some embodiments, the RF radiator may have at least one shape selected from the group consisting of cylindrical, triangular, conical, and bow-tie shapes.

In some embodiments, a distance between the RF radiator and the RF isolator may be determined based on the frequency, such that $$\text{distance} = \frac{1}{4}\lambda + \frac{1}{2}\lambda \times n$$

$\lambda$ being a wavelength of the frequency, n being an integer greater than or equal to 0).

In some embodiments, the opposite walls of the rectangular body are partially formed as a first assembly plate and a second assembly plate detachably connected to the rectangular body, respectively, wherein the first assembly plate may be connected to the rectangular body with the RF isolator and the RF radiator coupled to the first assembly plate and the second assembly plate may be connected to the rectangular body with the RF impedance matcher coupled to the second assembly plate.

In some embodiments, the waveguide may further include: one or more measurement adapters each coupled to a corresponding one of the respective flanges of the two openings of the rectangular body and allowing a coaxial cable of a measuring instrument to be connected thereto.

In accordance with another aspect of the disclosed technology, an RF heating apparatus includes the waveguide with the RF port input transition set forth above.

The embodiments of the disclosed technology can provide a waveguide with an RF port input transition, which can be used as a normal rectangular waveguide without disassembling and reassembling an RF system and can also be used in a measurement mode for instrumental measurement to determine characteristics of a certain RF component. In some embodiments, the embodiments of the disclosed technology can also provide an RF heating apparatus that includes the waveguide with the RF port input transition.

It will be understood that the advantageous effects of the disclosed technology are not limited to the above description and include any advantageous effects conceivable from the features disclosed in the detailed description of the disclosed technology or the appended claims.

DETAILED DESCRIPTION

The disclosed technology will be described hereinafter with reference to the accompanying drawings. However, the disclosed technology may be modified in various different ways, and the disclosed technology is not limited to the described exemplary embodiments. Moreover, the part not related to the description will be omitted in order to clearly describe the disclosed technology. Like reference numerals designate like elements throughout the specification.

Throughout the specification, when an element or layer is referred to as being "on," "connected to," or "coupled to" another element or layer, it may be directly on, connected to, or coupled to the other element or layer or intervening elements or layers may be present. In addition, unless stated otherwise, the term "includes" should be interpreted as not excluding the presence of other components than those listed herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

In the specification, λ generally refers to a wavelength. However, for a rectangular waveguide as described herein, λ may refer to a guided wavelength in the waveguide.

Figure 1:
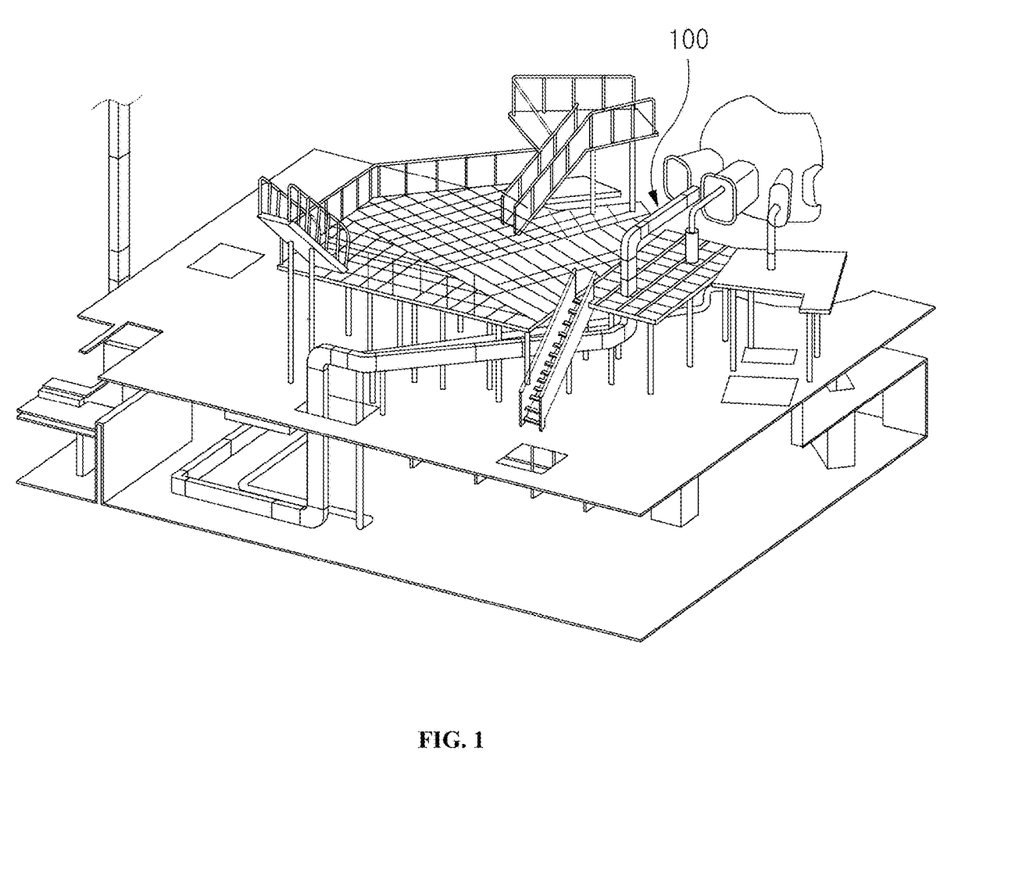
FIG. 1 illustrates a conceptual view illustrating that a waveguide with an RF port input transition according to one embodiment of the disclosed technology is installed on an RF heating apparatus in a nuclear fusion power plant.
Figure 2:
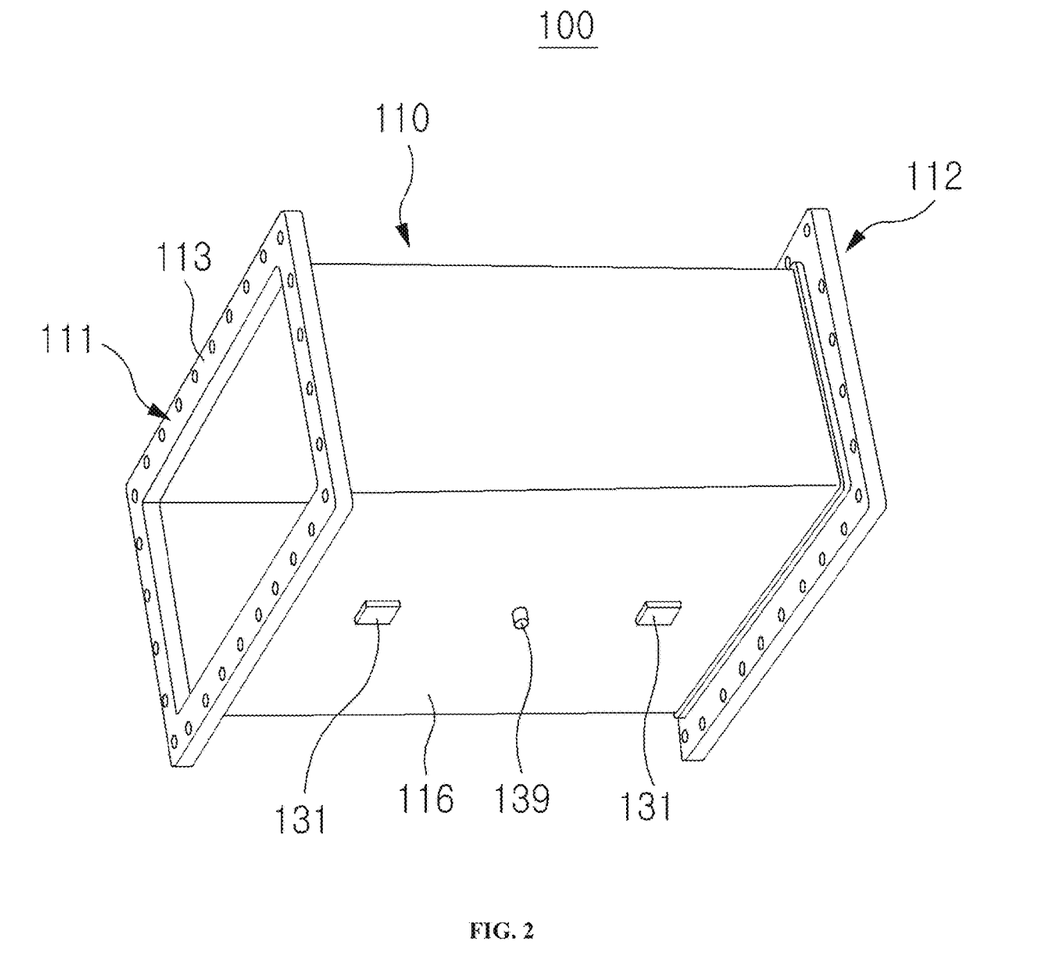
FIG. 2 illustrates a three-dimensional conceptual view of the waveguide of FIG. 1.
Figure 3:
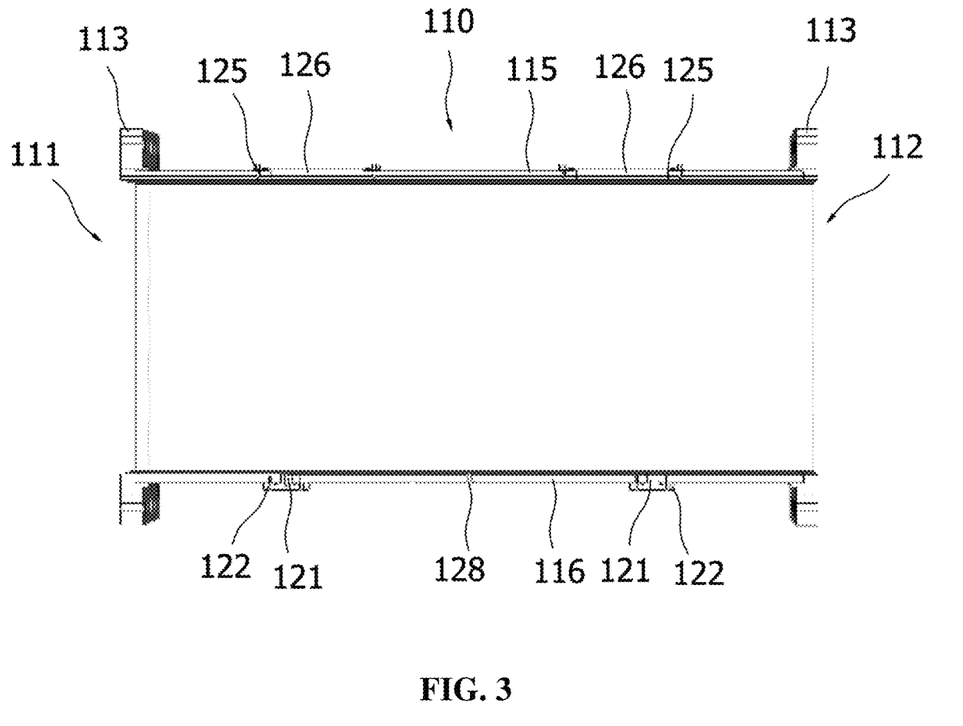
FIG. 3 illustrates a sectional view taken along a central length of FIG. 2.
Figure 4:
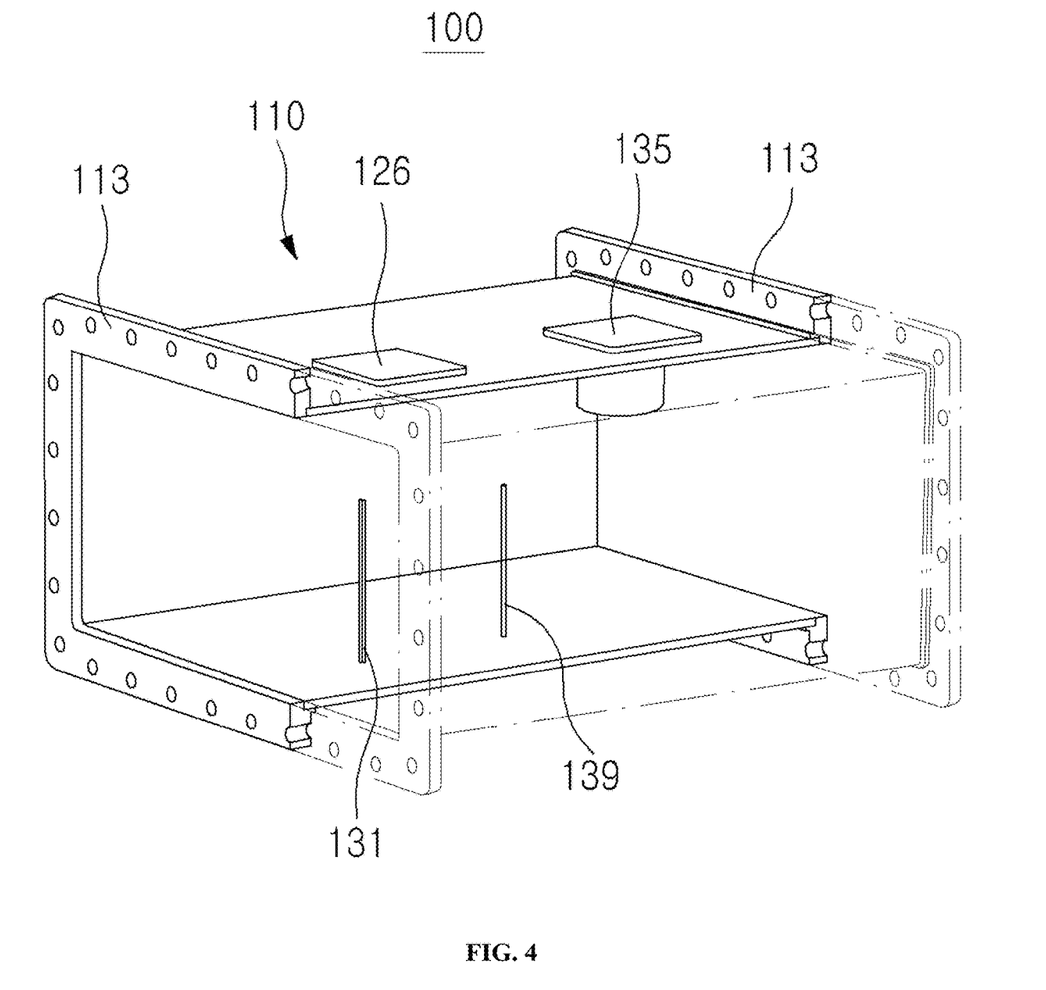
FIG. 4 illustrates a three-dimensional conceptual view of the waveguide from a different direction than FIG. 2, wherein the front of the waveguide is partially removed such that the inside thereof can be seen.

FIG. 1 illustrates a conceptual view illustrating that a waveguide with an RF port input transition according to one embodiment of the disclosed technology is installed on an RF heating apparatus in a nuclear fusion power plant. FIG. 2 illustrates a three-dimensional conceptual view of the waveguide of FIG. 1, FIG. 3 illustrates a sectional view taken along a central length of FIG. 2, and FIG. 4 illustrates a three-dimensional conceptual view of the waveguide from a different direction than FIG. 2, wherein the front of the waveguide is partially removed such that the inside thereof can be seen.

Referring to FIG. 1 to FIG. 4, the waveguide 100 with the RF port input transition, according to some embodiments, can also be used in a measurement mode and includes: a tubular rectangular body 110 having two openings 111, 112 formed on opposite sides thereof and each having a flange 113 formed therearound; multiple isolator ports 121 disposed at predetermined intervals on one wall of the rectangular body 110; multiple impedance matching ports 125 disposed at predetermined intervals on another wall of the rectangular body 110 opposite the one wall; and a radiator port 128 disposed at a center of the one wall of the rectangular body 110 to be switchable between open and closed states.

As shown in FIG. 2, the rectangular body 110 has a rectangular cross-section. Each of the flanges 112 has holes for coupling of another waveguide. As shown in FIG. 3, the isolator port 121 is formed as a small-diameter hole in a bottom plate 116 between the two flanges 113. The impedance-matching port 125 is formed as a large-diameter hole in a top plate 115 between the two flanges 113.

Although the rectangular body 110, which has a rectangular cross-section, is shown in the drawings, it will be understood that the disclosed technology is not limited thereto, and the body of the waveguide may have any suitable shape so long as the isolator ports 121 and the impedance matching ports 125 formed in the body can be completely closed such that the waveguide can be used a normal waveguide that transmits RF waves.

In addition, an RF isolator 131 can block the passage of RF waves, and an RF impedance matcher 135 may be installed on the rectangular body 110, such that the waveguide can be used in a measurement mode for measuring characteristics of RF waves in the waveguide.

Each of the multiple isolator ports 121 can be switchable between open and closed states to selectively connect the RF isolator 131 thereto and can be disposed at the center on either side of the bottom plate 116.

During normal use of the waveguide, respective isolator port covers 122 can be coupled to the multiple isolator ports 121 to close the isolator ports 121. In the measurement mode, one of the isolator port covers 122 can be removed from a corresponding isolator port 121, and the RF isolator 131 can be coupled to the isolator port 121.

In some embodiments, each impedance matching port 125 can be switchable between open and closed states to selectively connect the RF impedance matcher 135 thereto. The diameter of the impedance matching port 125 can be considerably larger than the diameter of the isolator port 121. During normal use of the waveguide, respective impedance-matching port covers 126 can be coupled to the impedance matching ports 125 to close the impedance matching ports 125. In the measurement mode, one of the impedance matching port covers 126 can be removed from a corresponding impedance matching port 125, and the RF impedance matcher 135 can be coupled to the impedance matching port 125.

The radiator port 128 can be disposed between the multiple isolator ports 121 of the rectangular body 110 to selectively connect an RF radiator 139 thereto, and can be formed as a small-diameter hole corresponding to the thickness of the RF radiator 139, that can, allowing the RF radiator 139 to be fitted thereinto.

In the measurement mode, the radiator port 128 can be fitted with the RF radiator 139 that radiates electromagnetic waves. During normal use of the waveguide, the radiator port 128 can be blocked by a stopper member (for example, a small-diameter bolt).

The waveguide 100 with the RF port input transition, according to some embodiments, which can also be used in the measurement mode, may provide a mounting structure. The structure can include the isolator ports 121, the impedance-matching ports 125, and the radiator port 128. The mounting structure can have both a standard mode for normal use and a measurement mode for measuring RF characteristics in the waveguide.

The waveguide 100 may further include, in the measurement mode, an RF isolator 131 coupled to one of the multiple isolator ports 121, an RF impedance matcher 135 coupled to one of the multiple impedance matching ports 125, and an RF radiator 139 coupled to the radiator port 128.

In this way, the waveguide 100 may be used in the measurement mode for the measurement of RF characteristics by coupling the RF isolator 131 that cancels out an RF wave traveling in an unwanted direction by generating an RF wave, having the same magnitude as the RF wave and an opposite phase to the RF wave, the RF impedance matcher 135 performing impedance matching for accurate measurement of RF waves, and the RF radiator 139 producing and radiating RF waves, to a corresponding isolator port 121, impedance matching port 125, and radiator port 128, respectively. The waveguide 100 may also be used as a normal waveguide in the standard mode, in which measurement of RF waves in the waveguide is not performed by disconnecting the RF isolator 131, the RF impedance matcher 135, and the RF radiator 139 from the respective ports.

Figure 5:
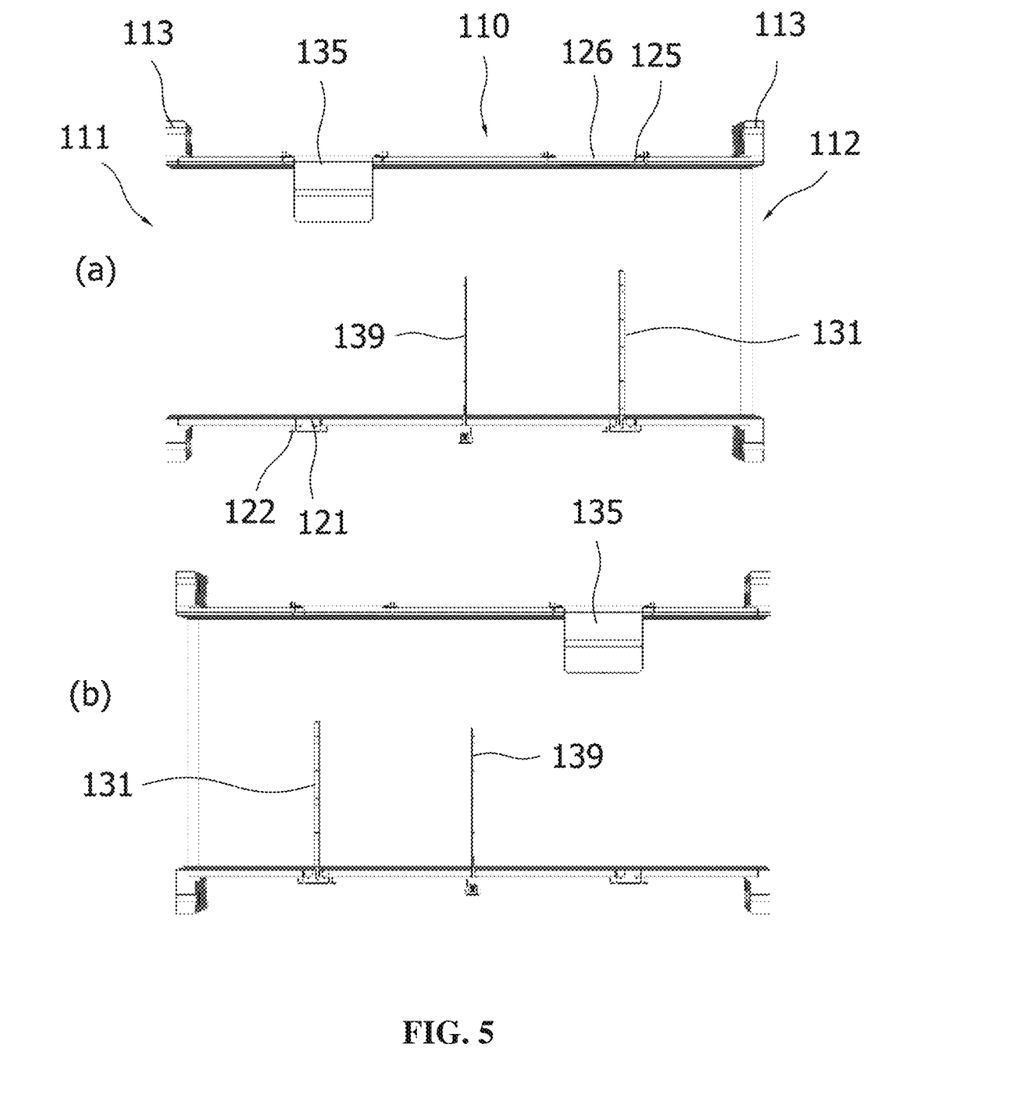
FIG. 5 illustrates a sectional view corresponding to FIG. 3, wherein an isolator and an impedance matcher are disposed diagonally opposite each other and a radiator is disposed at the center of the waveguide.

FIG. 5 illustrates a sectional view corresponding to FIG. 3, wherein the isolator and the impedance matcher are disposed diagonally opposite each other, and the radiator is disposed at the center of the waveguide.

Referring to FIG. 3 to FIG. 5, in some embodiments, the RF isolator 131 and the RF impedance matcher 135 may be disposed opposite each other with respect to the RF radiator 139.

For example, as shown in FIGS. 4 and 5, the RF isolator 131 and the RF impedance matcher 135 may be disposed at diagonally opposite locations between the first opening 111 on the left side of the rectangular body 110 and the second opening 112 on the right side of the rectangular body 110, depending on the direction in which RF characteristics of the waveguide are measured upon normal output of RF waves.

For example, referring to FIG. 3 and FIG. 5, when the RF impedance matcher 135 is coupled to an impedance matching port 125 close to the first opening 111 in the measurement mode, the RF isolator 131 may be coupled to an isolator port 121 between the second opening 112 and the center of the bottom plate 116. Conversely, when the RF impedance matcher 135 is coupled to an impedance matching port 125 close to the second opening 112, the RF isolator 131 may be coupled to an isolator port 121 between the first opening 111 and the center of the bottom plate 116.

As such, in the measurement mode, the RF isolator 131 and the RF impedance matcher 135 may need to be disposed diagonally opposite each other in order to ensure that RF waves radiated from the RF radiator 139 are directed to the RF impedance matcher 135 while being blocked on the side where the RF isolator 131 is disposed. Accordingly, normal operation of the waveguide can be checked in one direction in which radiation of RF waves is allowed and, on the side to which radiated RF waves are directed, impedance matching can be performed by the RF impedance matcher 135, thereby ensuring accurate and efficient detection of RF signals.

In some embodiments, the positions of the RF isolator 131 and the RF impedance matcher 135 can be switchable according to on which side of the waveguide measurement of RF waves is performed. In addition, the RF waves can be measured on both sides of the waveguide by changing the positions of the RF isolator 131 and the RF impedance matcher 135.

Figure 6:
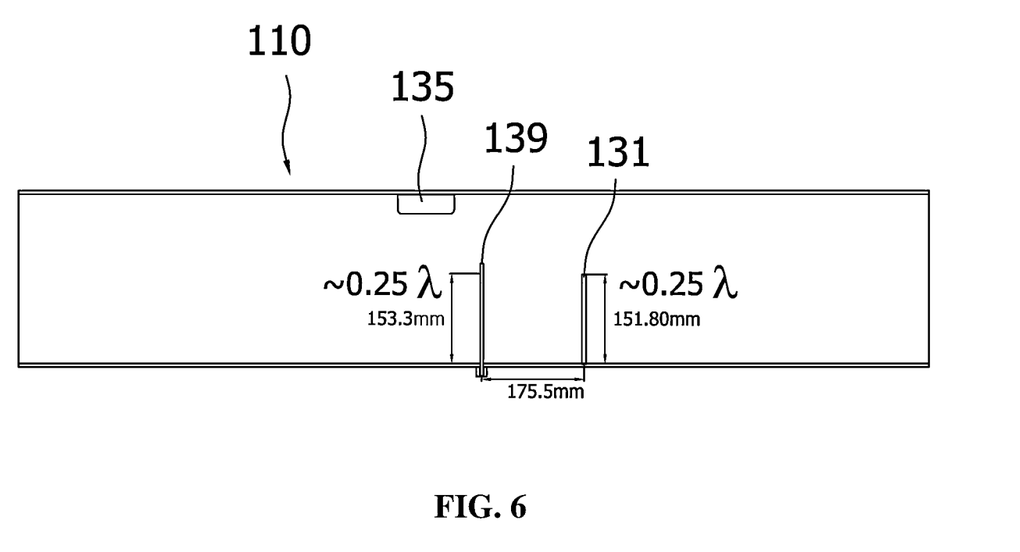
FIG. 6 illustrates a schematic sectional view illustrating a distance relationship between the isolator and the radiator in the waveguide and the height of the isolator according to the RF wavelength of the radiator according to one embodiment of the disclosed technology.

FIG. 6 illustrates a schematic sectional view illustrating a distance relationship between the isolator and the radiator in the waveguide and a height of the isolator according to the RF wavelength of the radiator according to one embodiment of the disclosed technology.

Referring to FIG. 4 to FIG. 6, the RF radiator 139 may be provided in the form of a bar that provides an RF wave, and the at a wavelength of (2 being a wavelength, n being an integer greater than or equal to 0). However, it can be understood that the disclosed technology is not limited thereto and the RF radiator 139 may have various other shapes, such as cylindrical, triangular, conical, and bow-tie shapes, so long as the RF radiator 139 can be mounted on the bottom plate 116 of the rectangular body 110. Further, assuming the RF radiator 139 is provided in the form of a (cylindrical) bar (n=0) as shown in FIG. 6, the RF radiator 139 may be configured to provide an RF wave at a wavelength of about 0.25λ.

In addition, the distance between the RF isolator 131 and the RF radiator 139 may be determined based on the frequency, such that $$\text{distance} = \frac{1}{4}\lambda + \frac{1}{2}\lambda \times n$$

(λ being a wavelength of the frequency, n being an integer greater than or equal to 0). Thus, referring to FIG. 6, the distance between the RF isolator 131 and the RF radiator 139 may be in the range of 175 mm to 176 mm, assuming that the RF wave has a frequency of 476 MHZ. Within this range of distance between the RF radiator 139 and the RF isolator 131, RF radiation from the RF radiator 139 can be effectively blocked by the RF isolator 131 inside the waveguide. Although FIG. 6 shows that the distance between the RF radiator 139 and the RF isolator 131 is greater than the height of the RF radiator 139, it will be understood that the disclosed technology is not limited thereto, and the distance between the RF radiator 139 and the RF isolator 131 may be smaller than the internal height of the waveguide. Although the distance between the RF isolator 131 and the RF radiator 139 can work for any value of n, n can be assumed to be zero in this embodiment to achieve miniaturization of the waveguide, which has been validated through real tests.

Figure 7A:
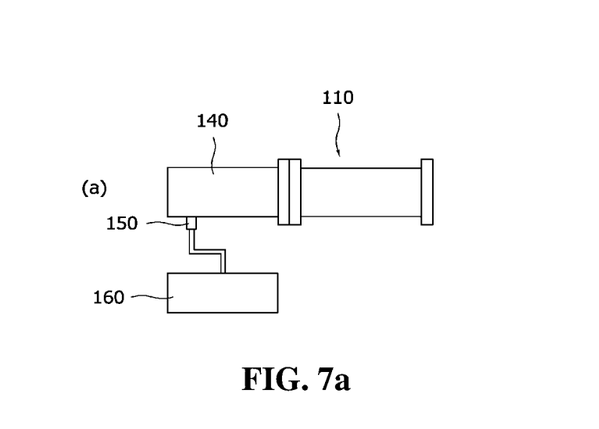
FIGS. 7*a* and 7*b* illustrates a conceptual view illustrating a method of measuring RF waveguide components, wherein the waveguide with the RF port input transition is used as an N-type RF connector (FIG. 7*a*) and an SMA type RF connector (FIG. 7*b*), according to one embodiment of the disclosed technology.
Figure 7B:
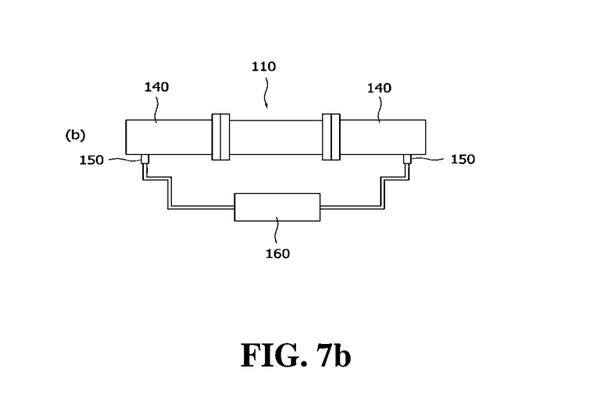

FIG. 7 illustrates a conceptual view illustrating a method of measuring RF waveguide components, wherein the waveguide with the RF port input transition is used as an N-type RF connector (shown in FIG. 7a) and an SMA type RF connector (shown in FIG. 7b), according to one embodiment of the disclosed technology.

Referring to FIG. 5 and FIG. 7, the waveguide with the RF port input transition may further include one or more measurement adapters 140 each coupled to a corresponding one of the respective flanges 113 of the two openings 111, 112 of the rectangular body 110 in the measurement mode, wherein the measurement adapter 140 is adapted for a coaxial cable of a measuring instrument to be connected thereto.

The measurement adapter 140 can be connected to a measuring instrument 160 that can measure RF waves via a cable connector 150 with the coaxial cable connected thereto. The cable connector 150 can be installed on the measurement adapter 140 or the waveguide only in the measurement mode. The cable connector 150 may not be necessary during the normal use of the waveguide. However, it will be understood that the disclosed technology is not limited thereto and the cable connector 150 may remain connected to the waveguide even during normal use of the waveguide for the purpose of monitoring the waveguide.

In some embodiments, the three internal structures mounted on the rectangular body 110, that is, the RF isolator 131, the RF impedance matcher 135, and the RF radiator 139, may be assembled independently of the other components, or may be integrally fabricated with the bottom plate or the top plate of the waveguide for ease of assembly, reproducibility of assembly results, and the like.

Figure 8:
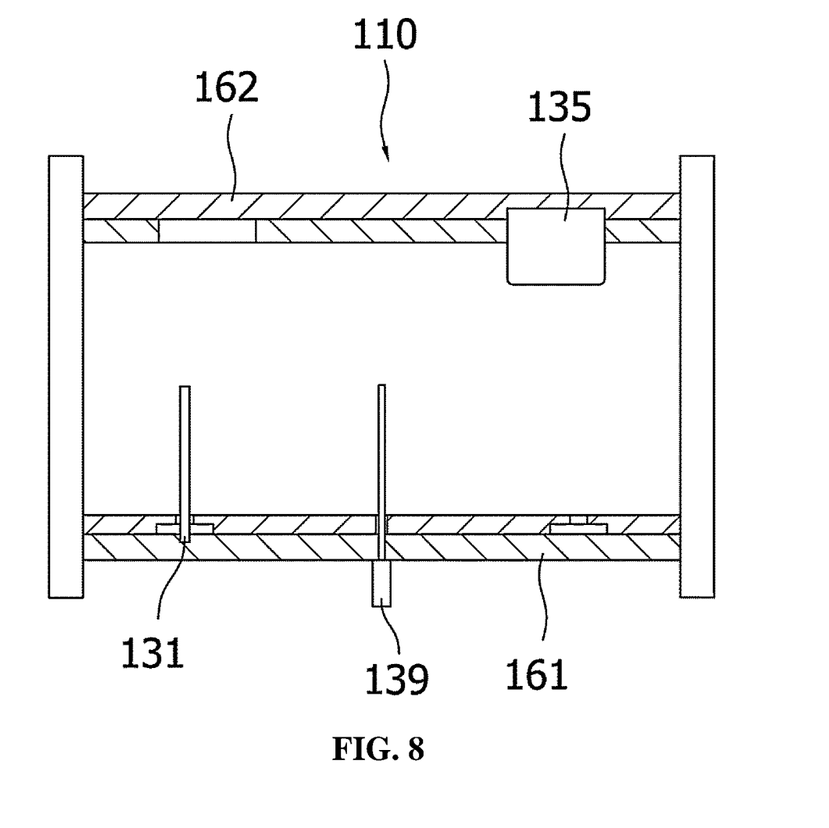
FIG. 8 illustrates a sectional view of a waveguide with an RF port input transition according to another embodiment of the disclosed technology.

FIG. 8 illustrates a sectional view of a waveguide with an RF port input transition according to some embodiments of the disclosed technology.

Referring to FIG. 8, in the waveguide according to some embodiments, the opposite walls of the rectangular body 110 may be partially formed as a first assembly plate 161 and a second assembly plate 162, respectively.

The first assembly plate 161 may be assembled to the rectangular body 110 with the RF isolator 131 and the RF radiator 139 coupled to the first assembly plate 161, and the second assembly plate 162 may be assembled to the rectangular body 110 with the RF impedance matcher 135 coupled to the second assembly plate 162.

According to the aforementioned embodiments, in the standard mode, the waveguide with the RF port input transition may be used as a normal waveguide and, in the measurement mode for instrumental measurement, the waveguide with the RF port input transition may be used as a measurement device simply by connecting the three additional internal structures thereto.

In this way, the embodiments of the disclosed technology can save time and labor by eliminating the need to disassemble and reassemble the waveguide upon performing RF measurement and can minimize adverse effects on the performance of an RF system to be measured by preventing a change in alignment between waveguides that may occur during disassembly and installation work.

Another aspect of the disclosed technology provides an RF heating apparatus, including the waveguide with the RF port input transition set forth above. The RF heating apparatus may be used in a nuclear fusion power plant. However, it will be understood that the disclosed technology is not limited thereto and the RF heating apparatus may be used in any facility that uses RF waves to accelerate and heat plasma particles.

Although some embodiments have been described herein, it should be understood that these embodiments are provided for illustration only and are not to be construed in any way as limiting the disclosed technology and that various modifications, changes, alterations, and equivalent embodiments can be made by those skilled in the art without departing from the spirit and scope of the invention. For example, components described as implemented separately may also be implemented in combined form, and vice versa.

The scope of the disclosed technology is indicated by the following claims and all changes or modifications derived from the meaning and scope of the claims and equivalents thereto should be construed as being within the scope of the disclosed technology.

What is claimed is:

1. A waveguide configured to transition between a normal use mode and a measurement mode, the waveguide comprising:
   a tubular rectangular body having openings formed at opposite sides thereof, each of the openings having a flange therearound;
   multiple isolator ports formed at first predetermined intervals in a first wall of the rectangular body, wherein each isolator port is switchable between open and closed states to allow an RF isolator to be selectively coupled thereto, wherein an isolator port cover is coupled to a corresponding isolator port of the isolator ports when the corresponding isolator port is at the closed state, and wherein the isolator port cover is removed when the corresponding isolator port is at the open state;
   multiple impedance matching ports formed at second predetermined intervals in a second wall of the rectangular body opposite the first wall, wherein each impedance matching port is switchable between open and closed states to allow an RF impedance matcher to be selectively coupled thereto, wherein an impedance matching port cover is coupled to a corresponding impedance matching port of the impedance matching ports when the corresponding impedance matching port is at the closed state, and wherein the impedance matching port cover is removed when the corresponding impedance matching port is at the open state; and
   a radiator port formed at a center of the first wall of the rectangular body, wherein the radiator port is switchable between open and closed states to allow an RF radiator to be selectively coupled thereto, wherein the radiator port is fitted to the RF radiator when the radiator port is at the open state, and wherein the radiator port is blocked by a stopper when the radiator port is at the closed state,
   wherein the waveguide is operable in the measurement mode for measuring RF characteristics of the rectangular body transmitting RF waves therein.

2. The waveguide of claim 1, further comprising:
   in the measurement mode, the RF isolator coupled to one of the multiple isolator ports;
   the RF impedance matcher coupled to one of the multiple impedance matching ports; and
   the RF radiator coupled to the radiator port,
   wherein the RF isolator and the RF impedance matcher are disposed opposite each other with respect to the RF radiator.

3. The waveguide of claim 2, wherein the RF radiator is provided in a form of a bar, wherein a height of the bar is related to a radiation frequency wave of the RF radiator by a relationship is represented as:

$$\text{height of the bar} = \frac{1}{4}\lambda + \frac{1}{2}\lambda \times n,$$

wherein $\lambda$ is a wavelength of the radiation frequency wave, and wherein n is an integer greater than or equal to 0.

4. The waveguide of claim 2, wherein the RF radiator has at least one shape selected from the group consisting of cylindrical, triangular, conical, and bow-tie shapes.

5. The waveguide of claim 2, wherein a distance between the RF radiator and the RF isolator is determined based on a radiation frequency wave, wherein the distance is determined by $$\text{distance} = \frac{1}{4}\lambda + \frac{1}{2}\lambda \times n,$$

wherein $\lambda$ is a wavelength of the radiation frequency wave, and wherein n is an integer greater than or equal to 0.

6. The waveguide of claim 2, wherein:
   the first and second walls of the rectangular body are partially formed as a first assembly plate and a second assembly plate detachably connected to the rectangular body, respectively;
   the first assembly plate is connected to the rectangular body with the RF isolator and the RF radiator coupled to the first assembly plate; and
   the second assembly plate is connected to the rectangular body with the RF impedance matcher coupled to the second assembly plate.

7. The waveguide of claim 1, further comprising:
   one or more measurement adapters each coupled to a corresponding one of the respective flanges of the two openings of the rectangular body and allowing a coaxial cable of a measuring instrument to be connected thereto.

8. An RF heating apparatus comprising the waveguide configured to transition between a normal use mode and a measurement mode according to claim 1.

* * * * *